United States Patent [19]
Kawagoshi

[11] Patent Number: 6,043,618
[45] Date of Patent: Mar. 28, 2000

[54] MOTOR DRIVING APPARATUS HAVING BACK-GATE-FLOATING MOSFET FOR AVOIDING REVERSE CURRENT

[75] Inventor: Hirokazu Kawagoshi, Shiga, Japan

[73] Assignee: NEC Corporation, Tokyo, Japan

[21] Appl. No.: 09/124,989

[22] Filed: Jul. 30, 1998

[30]       Foreign Application Priority Data

Jul. 30, 1997   [JP]   Japan .................................. 9-203684

[51] Int. Cl.⁷ .................................................. H02K 23/00
[52] U.S. Cl. .......................... 318/254; 318/801; 318/811
[58] Field of Search ................................... 318/254, 439,
            318/138, 375, 376, 758, 759, 762, 798–811

[56]              References Cited

U.S. PATENT DOCUMENTS

| | | | |
|---|---|---|---|
| 4,319,174 | 3/1982 | Cook et al. ............................. | 318/696 |
| 5,455,496 | 10/1995 | Williams et al. ........................ | 318/563 |
| 5,504,402 | 4/1996 | Menegoli ................................. | 318/377 |
| 5,508,874 | 4/1996 | Williams et al. ........................ | 361/92 |
| 5,543,734 | 8/1996 | Volk et al. ................................ | 326/83 |

FOREIGN PATENT DOCUMENTS 7-45826   2/1995   Japan .

*Primary Examiner*—Brian Sircus
*Attorney, Agent, or Firm*—Foley & Lardner

[57]              ABSTRACT

In an apparatus for driving a motor including first and second terminals, a back-gate-floating MOSFET has a drain connected to the first terminal. A bridge circuit is connected between the source of the back-gate-floating MOSFET and the second terminal, and supplies a load current to the motor. A step-up circuit is connected to the first terminal and the gate of the back-gate-floating MOSFET, and controls the back-gate-floating MOSFET in accordance with a voltage at the first terminal.

7 Claims, 3 Drawing Sheets

MOTOR DRIVING APPARATUS HAVING BACK-GATE-FLOATING MOSFET FOR AVOIDING REVERSE CURRENT

BACKGROUND OF THE INVENTION

1. Field of the Invention

The present invention relates to a motor driving apparatus such as an apparatus for driving a spindle motor of a hard disc drive (HDD) unit where a counter-electromotive force of the spindle motor is used for performing a retracting operation upon a voice coil motor (VCM) of the HDD unit.

2. Description of the Related Art

In an HDD unit formed by a spindle motor and a voice coil motor, when a power supply voltage applied to a spindle motor driving apparatus drops, a counter-electromotive force generated in the spindle motor is used to perform a retracting operation upon the voice coil motor, thus recovering the original position thereof.

In a prior art motor driving apparatus for a spindle motor, in order to supply a current due to the counter-electromotive force generated in the spindle motor to a motor driving apparatus for a voice coil motor, a reverse current preventing Schottkey diode is indispensible, which will be explained later in detail (see FIG. 5 of JP-A-7-45826).

In the above-described prior art motor driving apparatus however, in a normal operation mode, the power supply voltage minus a forward voltage of the reverse current preventing Schottkey diode is applied to the motor driving apparatus. Therefore, if the power supply voltage is low, it is impossible to effectively apply power to the spindle motor.

SUMMARY OF THE INVENTION

It is an object of the present invention to effectively apply power to a motor such as a spindle motor of an HDD unit.

According to the present invention, in an apparatus for driving a motor including first and second terminals, a back-gate-floating metal oxide semiconductor field effect transistor (MOSFET) has a drain connected to the first terminal. A bridge circuit is connected between the source of the back-gate-floating MOSFET and the second terminal, and supplies a load current to the motor. A step-up circuit is connected to the first terminal and the gate of the back-gate-floating MOSFET, and controls the back-gate-floating MOSFET in accordance with a voltage at the first terminal.

Under a normal operation, since the ON resistance of the back-gate-floating MOSFET is very small, a power supply voltage applied directly to the first terminal can also be applied to the bridge circuit.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiment, a prior art HDD motor driving apparatus will be explained with reference to FIG. 1 (see FIG. 5 of JP-A-7-45826).

Figure 1:
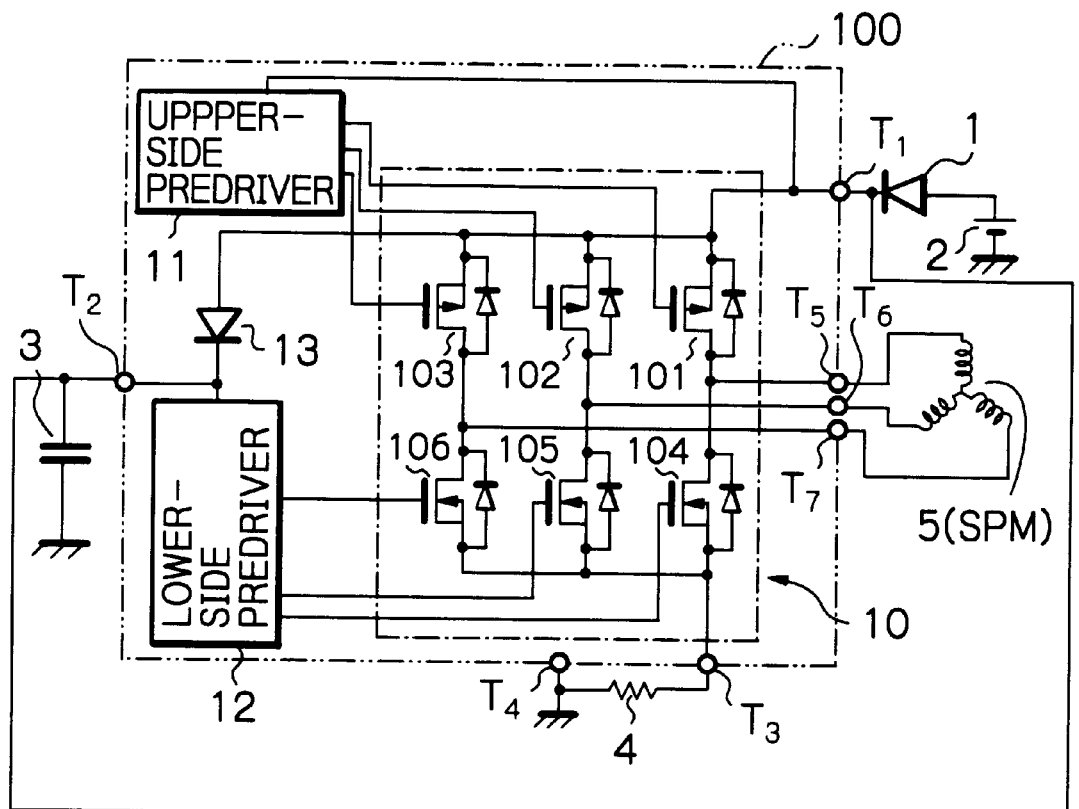
FIG. 1 is a circuit diagram illustrating a prior art motor driving apparatus.
Figure 1:
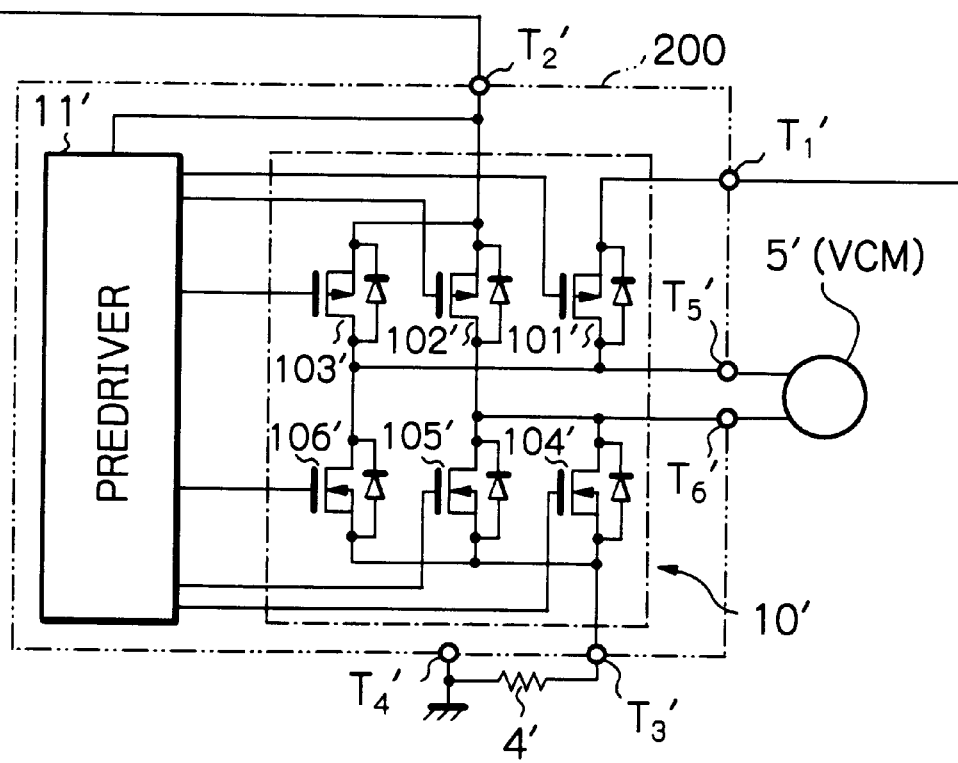

In FIG. 1, reference numeral 100 designates a spindle motor (SPM) driving apparatus which may be constructed by a single semiconductor integrated circuit device that has terminals $T_1$, $T_2$, $T_3$, $T_4$, $T_5$, $T_6$ and $T_7$. In this case, the terminal $T_4$ is grounded.

The terminal $T_1$ is connected via a reverse current preventing Schottkey diode 1 to a power supply source 2.

A backup capacitor 3 is connected between the terminals $T_2$ and $T_4$.

A sense resistor 4 is connected between the terminals $T_3$ and $T_4$.

A three-phase spindle motor (SPM) 5 is connected to the terminals $T_5$, $T_6$ and $T_7$.

Provided within the motor driving apparatus 100 are a three-phase bridge circuit 10, an upper-side predriver 11, a lower-side predriver 12, and a diode 13 for avoiding the discharging of charges in the backup capacitor 3 to the power supply source 2.

The three-phase bridge circuit 10 is constructed by P-channel power MOSFETs 101, 102 and 103 and N-channel power MOSFETs 104, 105 and 106. The sources of the MOSFETs 101, 102 and 103 are connected to the terminal $T_1$, while the sources of the MOSFETs 104, 105 and 106 are connected to the terminal $T_3$. The drains of the MOSFETs 101 and 104 are connected to the terminal $T_5$, the drains of the MOSFETs 102 and 105 are connected to the terminal $T_6$, and the drains of the MOSFETs 103 and 106 are connected to the terminal $T_7$.

The upper-side predriver 11 controls the MOSFETs 101, 102 and 103, while the lower-side predriver 12 controls the MOSFETs 104, 105 and 106.

The upper-side predriver 11 is powered by the power supply source 2, while the lower-side predriver 12 is powered by the backup capacitor 3.

On the other hand, reference numeral 200 designates a VCM driving apparatus which may be constructed by a single semiconductor integrated circuit device that has terminals $T_1'$, $T_2'$, $T_3'$, $T_4'$, $T_5'$ and $T_6'$. In this case, the terminal $T_4'$ is grounded.

The terminal $T_1'$ is connected via the reverse current preventing Schottkey diode 1 to the power supply source 2.

The backup capacitor 3 is connected to the terminal $T_2'$.

A sense resistor 4' is connected between the terminals $T_3'$ and $T_3'$.

A voice coil motor (VCM) 5' is connected to the terminals $T_5'$ and $T_6'$.

Provided within the VCM driving apparatus 200 are a bridge circuit 10' and a predriver 11'.

The bridge circuit 10' is constructed by P-channel power MOSFETs 101', 102' and 103' and N-channel power MOSFETs 104', 105' and 106'. The source of the MOSFET 101' is connected to the terminal $T_1'$, while the sources of the MOSFETs 102' and 103' are connected to the terminal $T_2'$. Also, the sources of the MOSFETs 104', 105' and 106' are connected to the terminal $T_3'$. The drains of the MOSFETs 101', 103' and 106' are connected to the terminal $T_5'$, and the drains of the MOSFETs 102', 104' and 105' are connected to the terminal $T_6'$. The MOSFETs 101' and 104' are used for carrying out a retracting operation, and the MOSFETs 102', 103', 105' and 106' are used for carrying out a normal operation.

The predriver 11' controls the MOSFET 101', 102', 103', 104', 105' and 106'.

The predriver 11' is powered by the backup capacitor 3.

Since the source of the MOSFET 101' is connected to the terminal T$_1$', when the power supply voltage of the power supply source 2 drops, the voice coil motor 5' is driven by a counter-electromotive force of the spindle motor 5, so that the voice coil motor 5' recovers its original start point. This is called a retracting operation.

In more detail, when the power supply voltage of the power supply source 2 is decreased, the upper-side predriver 11 powered by the power supply source 2 turns OFF all the MOSFETs 101, 102 and 103, while the lower-side predriver 12 powered by the backup capacitor 3 turns ON the MOSFETs 104 and 105 and turns OFF the MOSFET 106. As a result, a counter-electromotive force is generated in the terminal T$_7$, so that a current flows from the terminal T$_7$ via a parasitic diode of the MOSFET 103 to the terminal T$_1$, i.e., the terminal T$_1$' of the VCM driving apparatus 200. Thus, the voice coil motor 5' carries out a retracting operation using the counter-electromotive force generated in the spindle motor 5.

In FIG. 1, in order to supply a current due to the counter-electromotive force to the VCM driving apparatus 200, the reverse current preventing Schottkey diode 1 is indispensible.

In FIG. 1, however, in a normal operation mode, the power supply voltage minus a forward voltage VF of the reverse current preventing Schottkey diode 1 is applied to the terminal T$_1$. Note that this forward voltage VF is about 0.4 V regardless of a load current flowing through the reverse current preventing Schottkey diode 1. Therefore, if the power supply voltage of the power supply source 2 is low, it is impossible to effectively apply power to the spindle motor 5.

Figure 2:
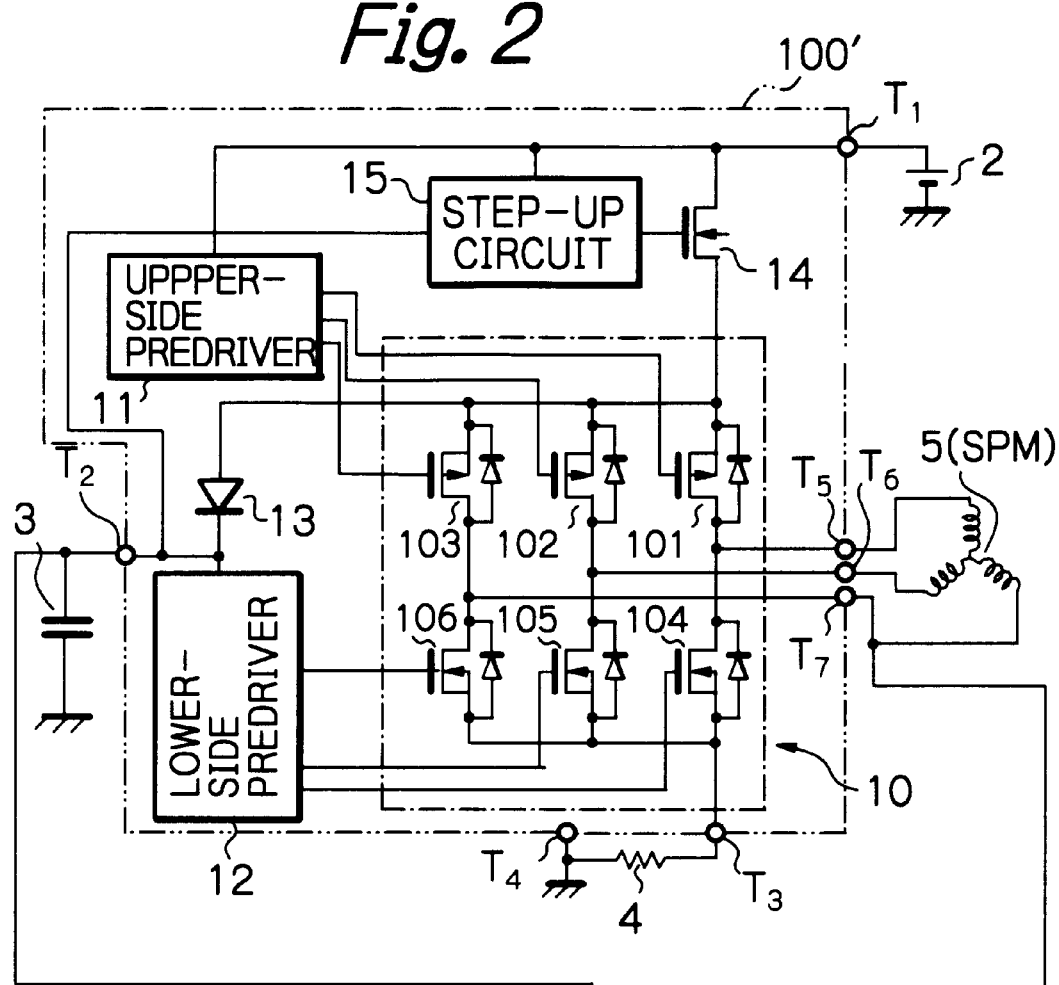
FIG. 2 is a circuit diagram illustrating an embodiment of the motor driving apparatus according to the present invention.
Figure 2:
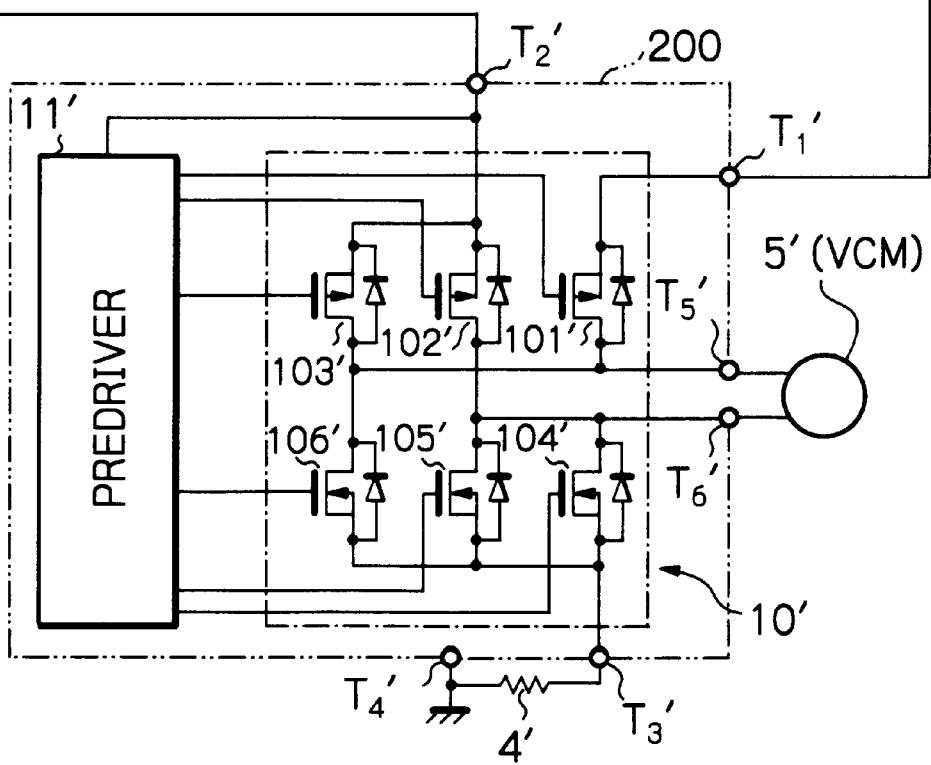

In FIG. 2, which illustrates an embodiment of the present invention, the reverse current preventing Schottkey diode 1 of FIG. 1 is not provided, and the SPM driving apparatus 100 of FIG. 1 is modified to an SPM driving apparatus 100'. Also, the terminal T$_1$' of the VCM driving apparatus 200 is connected to the terminal T$_7$ of the SPM driving apparatus 100'.

In the SPM driving apparatus 100', an N-channel back-gate-floating MOSFET 14 and a step-up circuit 15 for controlling the back-gate-floating MOSFET 14 are added to the elements of the SPM driving apparatus 100. That is, the MOSFET 14 has a drain connected to the terminal T$_1$, a gate connected to the step-up circuit 15, and a source connected to the sources of the MOSFETs 101, 102 and 103. A back gate of the MOSFET 14 is in a floating state.

Note that the step-up circuit 15 is powered by the backup capacitor 3.

The step-up circuit 15 is explained next in detail with reference to FIG. 3.

The step-up circuit 15 is constructed by a voltage comparator 151, a pulse generating circuit 152 for generating two opposite phase signals φ$_1$ and φ$_2$, a charge pump circuit 153 formed by two diodes 1531 and 1532 and two capacitors 1533 and 1534, a diode 154 for preventing a reverse direction pumping operation from the charge pump circuit 153 to the power supply source 2, a P-channel MOSFET 155 connected between the diode 154 and the charge pump circuit 153 and controlled by the output signal of the voltage comparator 151, and an N-channel MOSFET 156 connected between the output of the charge pump circuit 153 and the ground and controlled by the output signal of the voltage comparator 151. The output signal of the charge pump circuit 153 is supplied to the gate of the MOSFET 14, thus burning ON and OFF the MOSFET 14.

A reference voltage V$_R$ of the voltage comparator 151 is generated by a voltage divider for dividing the voltage at the backup capacitor 3. Such a voltage divider can be introduced into the semiconductor integrated circuit device of the apparatus 100'.

Also, in a normal operation mode, the charge pump circuit 153 is operated by the power supply voltage of the power supply source 2 to turn ON the MOSFET 14. In this case, since the MOSFET 14 is kept ON, the capacitances of the capacitors 1533 and 1534 do not need to be large. For example, the capacitances of the capacitors 1533 and 1534 are several pF to tens of pF. Therefore, the capacitors 1533 and 1534 also can be introduced into the semiconductor integrated circuit device of the apparatus 100'.

Figure 3:
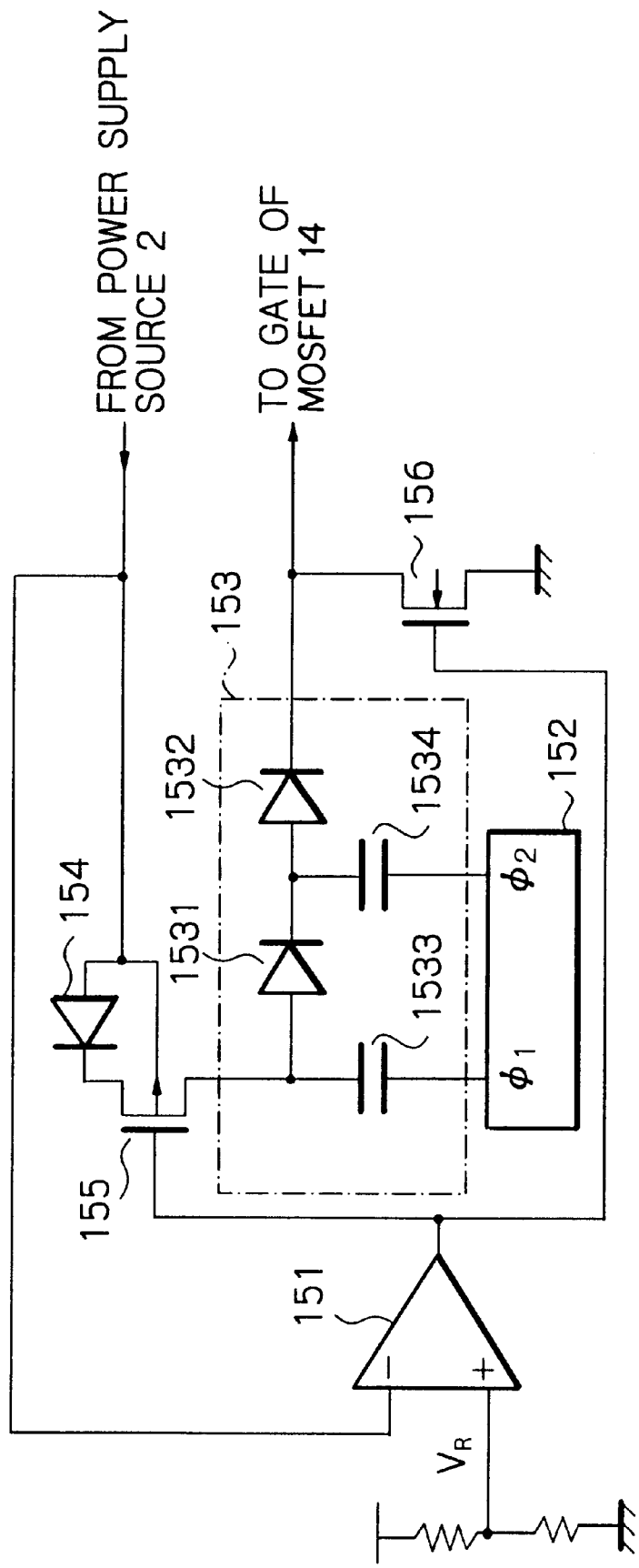
FIG. 3 is a detailed circuit diagram of the step-up circuit of FIG. 2.

The operation of the step-up circuit 15 of FIG. 3 is explained first.

When the power supply voltage of the power supply source 2 is normal, so that this power supply voltage is higher than the reference voltage V$_R$, the output signal of the voltage comparator 151 is low. As a result, the MOSFETs 155 and 156 are turned ON and OFF, respectively. Therefore, the charge pump circuit 153 is supplied with the power supply voltage from the power supply source 2, so that the step-up voltage is applied to the gate of the MOSFET 14.

On the other hand, when the power supply voltage of the power supply source 2 is abnormal, so that this power supply voltage is lower than the reference voltage V$_R$, the output signal of the voltage comparator 151 is high. As a result, the MOSFETs 155 and 156 are turned OFF and ON, respectively. Therefore, charges stored in the capacitor 1533 are discharged from the back gate of the MOSFET 155 to the terminal T$_1$. Simultaneously, the output of the charge pump circuit 153 is grounded by the MOSFET 156. Thus, the gate of the MOSFET 14 is grounded.

The operation of the apparatus of FIG. 2 is explained next.

When the power supply voltage of the power supply source 2 is normal, the step-up voltage of the step-up circuit 15 is applied to the gate of the MOSFET 14, so that the MOSFET 14 is turned ON. As a result, the power supply voltage minus a voltage drop defined by the MOSFET 14 is applied to the sources of the MOSFETs 101, 102 and 103. In This case, if the ON resistance of the MOSFET 14 is 0.4 Ω and a load current flowing therethrough is 0.2 A, this voltage drop is 0.08 V (=0.4×0.2). This voltage drop is considerably smaller than the forward voltage VF of the reverse current preventing Schottkey diode 1 of FIG. 1.

On the other hand, when the power supply voltage of the power source 2 is abnormal, so that this power supply voltage is lower than the reference voltage V$_A$, the gate of the MOSFET 14 is grounded. As a result, the MOSFET 14 is turned OFF. In this state, the upper-side predriver 11 turns OFF the MOSFETs 101, 102 and 103 and the lower-side predriver 12 turns ON the MOSFETs 104 and 105 and turns OFF the MOSFET 106. As a result, a counter-electromotive force is generated in the terminal T$_7$. A current due to this counter-electromotive force does not flow through the parasitic diode of the MOSFET 103, since the MOSFET 14 is turned OFF. Therefore, this current is completely supplied to the terminal T$_1$' of the VCM driving apparatus 200. Thus, the voice coil motor 5' carries out a retracting operation.

In the above-mentioned embodiment, the spindle motor can be a first motor and the voice coil motor can be a second motor which carries out a retracting operation using a counter-electromotive force of the first motor.

As explained hereinabove, according to the present invention, since a back-gate-floating MOSFET controlled by a step-up circuit is connected to a power supply terminal without a reverse current preventing diode, it is possible to effectively supply power from a power supply source to a motor.

I claim:

1. An apparatus for driving a first motor, comprising:

first and second terminals;

a back-gate-floating MOSFET having a drain connected to said first terminal and a source;

a bridge circuit, connected between the source of said back-gate-floating MOSFET and said second terminals for supplying a load current to said first motor; and a step-up circuit, connected to said first terminal and a gate of said back-gate-floating MOSFET, for controlling said back-gate-floating MOSFET in accordance with a voltage at said first terminal.

2. The apparatus as set forth in claim 1, wherein, when the voltage at said first terminal is higher than a reference voltage, said step-up circuit turns ON said back-gate-floating MOSFET, and when the voltage at said first terminal is not higher than said reference voltage, said step-up circuit turns OFF said back-gate-floating MOSFET.

3. The apparatus as set forth in claim 1, wherein said step-up circuit comprises:

a voltage comparator for comparing the voltage at said first terminal with a reference voltage;

a pulse generator;

a charge pump circuit, connected to said pulse generator and said back-gate-floating MOSFET, for generating a step-up signal using pulses of said pulse generator and transmitting said step-up signal to a gate of said back-gate-floating MOSFET;

a diode, connected to said first terminal, for avoiding a reverse current from said charge pump circuit to said first terminal;

a first switch circuit, connected between said diode and an input of said charge pump circuit, for electrically connecting said diode to the input of said charge pump circuit in accordance with an output of said voltage comparator; and a second switch circuit, connected between an output of said charge pump circuit and said second terminal, for electrically connecting the output of said charge pump circuit to said second terminal in accordance with said voltage comparator.

4. The apparatus as set forth in claim 3, wherein said first switch circuit comprises a P-channel MOSFET having a source connected to a cathode of said diode, a drain connected to an input of said charge pump circuit, a gate connected to the output of said voltage comparator, a back gate connected to an anode of said diode, said second switch circuit comprising an N-channel MOSFET having a source connected to said second terminal, a drain connected to the output of said charge pump circuit, and a gate connected to the output of said voltage comparator.

5. The apparatus as set forth in claim 3, wherein said charge pump circuit comprises:

first and second diodes connected in series between the input and output of said charge pump circuit;

a first capacitor connected between an anode of said first diode and a first output of said pulse generator; and a second capacitor connected between an anode of said second diode and a second output of said pulse generator.

6. The apparatus as set forth in claim 1, wherein said bridge circuit is connected to an apparatus for driving a second motor, said second motor driving apparatus being driven by a counter-electromotive force generated in said first motor so as to perform a retracting operation upon said second motor when the voltage at said first terminal becomes lower than a predetermined value.

7. The apparatus as set forth in claim 6, wherein said first and second motors comprise a spindle motor and a voice coil motor, respectively, of a hard disc drive unit.

* * * * *